(12) United States Patent
Weydert et al.

(10) Patent No.: US 12,304,979 B2
(45) Date of Patent: May 20, 2025

(54) DIENE-BASED ELASTOMER AND A RUBBER COMPOSITION

(71) Applicants: The Goodyear Tire & Rubber Company, Akron, OH (US); LUXEMBOURG INSTITUTE OF SCIENCE AND TECHNOLOGY, Esch-sur-Alzette (LU)

(72) Inventors: Marc Weydert, Bertrange (LU); Suzanne Michelle Balko, Konz (DE); Felipe Nunes Linhares, Esch-sur-Alzette (LU); Roberto Quintana Vicente, Esch-sur-Alzette (LU); Reiner Dieden, Esch-sur-Alzette (LU); Vincent Berthe, Esch-sur-Alzette (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 576 days.

(21) Appl. No.: 17/656,112

(22) Filed: Mar. 23, 2022

(65) Prior Publication Data

US 2022/0356277 A1 Nov. 10, 2022

Related U.S. Application Data

(60) Provisional application No. 63/180,303, filed on Apr. 27, 2021.

(51) Int. Cl.
C08F 136/14 (2006.01)

(52) U.S. Cl.
CPC .................. C08F 136/14 (2013.01)

(58) Field of Classification Search
CPC .................................. C08F 136/00
See application file for complete search history.

(56) References Cited

U.S. PATENT DOCUMENTS

| 7,342,070 B2 | 3/2008 | Tsukimawashi et al. |
| 7,956,146 B2 * | 6/2011 | Zhao ............ B60C 1/0016 152/905 |

(Continued)

FOREIGN PATENT DOCUMENTS

| CN | 112457544 A | 3/2021 |
| JP | 2012158697 A | 8/2012 |
| KR | 20150017490 A | 2/2015 |

OTHER PUBLICATIONS

Kukut, M., et al., Designed Monomers and Polymers, 2009 12 167-176 (Year: 2009).*

(Continued)

*Primary Examiner* — Robert S Jones, Jr.
*Assistant Examiner* — Lily K Sloan
(74) *Attorney, Agent, or Firm* — Mandy B. Willis

(57) ABSTRACT

The present invention is directed to a benzoxazine-functionalized diene-based elastomer comprising polymer chains including repeat units which include conjugated diolefin monomers, such as 1,3-butadiene and isoprene. Additionally, said elastomer comprises at least one benzoxazine connected to a polymer chain via a spacer, wherein the spacer has a length ranging from 3 to 8 atoms. A further aspect of the present invention is directed to a rubber composition comprising such an elastomer, an article of manufacture comprising this rubber composition, and a method of making said benzoxazine-functionalized diene-based elastomer.

11 Claims, 1 Drawing Sheet

(56) References Cited

U.S. PATENT DOCUMENTS

| | | | |
|---|---|---|---|
| 10,538,648 | B2 | 1/2020 | Sung et al. |
| 2018/0186976 | A1 | 7/2018 | Sung et al. |
| 2019/0300765 | A1 | 10/2019 | Fedurco et al. |
| 2021/0309838 | A1 | 10/2021 | Weydert et al. |

OTHER PUBLICATIONS

Dizman, C., et al., Designed Monomers and Polymers, 2017 vol. 20, No. 1, p. 293-299 (Year: 2017).*

Ebewele, R.O.; Polymer Science and Technology, 2000, p. 441-443, CRC Press (Year: 2000).*

Chinese Office Action for Application No. 202210451824.5, dated Mar. 27, 2024.

Chia Yeh Chu and Rastko Vukov, Determination of the structure of butyl rubber by NMR spectroscopy, Determination of the structure of butyl rubber by NMR spectroscopy, 1985, 1423-1430, vol. 18, No. 7, Macromolecules.

McNeish Joanne R et al, Halogenated poly(isobutylene-co-isoprene): influence of halogen leaving-group and polymer microstructure on chemical reactivity, Halogenated poly(isobutylene-co-isoprene): influence of halogen leaving-group and polymer microstructure on chemical reactivity, Jan. 1, 2013 (Jan. 1, 2013), 420-427, vol. 91, No. 6,, Canadian Journal of Chemistry, NRC Research Press, CA.

Search Report for European Serial No. EP22168674 dated Sep. 28, 2022.

Chinese Office Action for Application No. 202210451824.5, dated Nov. 7, 2023.

Chinese Office Action for Application No. 202210451824.5, dated Sep. 6, 2024.

* cited by examiner

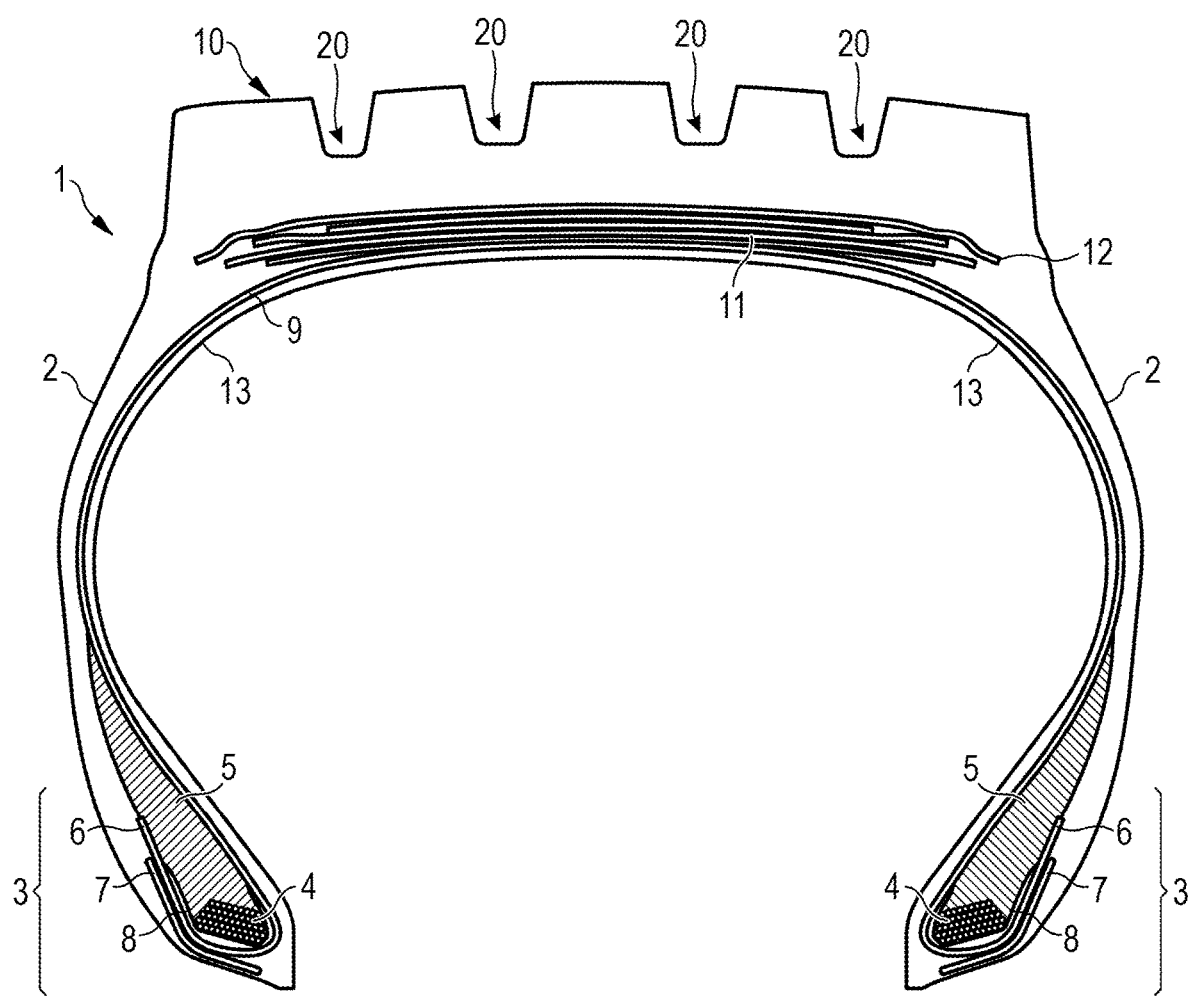

DIENE-BASED ELASTOMER AND A RUBBER COMPOSITION

FIELD OF THE INVENTION

The present invention relates to benzoxazine-functionalized diene-based elastomers, a method of making such elastomers as well as rubber compositions comprising the latter. The rubber composition can also be used in an article of manufacture such as a tire.

BACKGROUND OF THE INVENTION

Polymer manufacturers and rubber compounders are continuously searching for new ways of reinforcing elastomer compositions. Various grades of carbon black and silica are typically used for reinforcing rubber compositions. In some cases alternative materials, for instance thermoplastic materials such as ultra-high molecular weight polyethylene or syndiotactic polybutadiene are added to conventional filler materials in order to improve the reinforcing properties of rubber compositions. While various approaches for reinforcing rubber materials have been suggested in the past, significant room for further development and improvement remain.

U.S. Pat. No. 10,538,648 B2 discloses a rubber composition containing main-chain benzoxazine, in which benzoxazine is reported to generate no harmful materials during vulcanization and can thus be used in lieu of conventional phenol novolac resins which are commonly used as a resin component of conventional rubber compositions. This patent also reports that the use of benzoxazine, especially main-chain benzoxazine having a high molecular weight, facilitates the capability of maintaining excellent mechanical properties and exhibiting high flexibility. The rubber composition described in U.S. Pat. No. 10,538,648 B2 is also reported to be useful for utilization in tires. U.S. Pat. No. 10,538,648 B2 specifically claims a rubber composition comprising a raw rubber and a polymer comprising a benzoxazine ring in its main chain (main-chain benzoxazine). The main-chain benzoxazine can have a weight average molecular weight which is within the range of 500 g/mol to 10,000 g/mol.

SUMMARY OF THE INVENTION

One object of the present invention may be to provide an advanced diene-based elastomer, and optionally a method of making such an elastomer.

Another object of the invention may be to provide a new reinforcing material which may be used to reinforce polymer matrixes.

Another object of the invention may be to provide an elastomer comprising reinforcing properties.

The scope of protection of the present invention is defined by the independent claims, further preferred embodiments are recited in the dependent claims and the aspects and embodiments provided in the summary and description herein below.

In a first aspect, the present invention is directed to a benzoxazine-functionalized diene-based elastomer comprising polymer chains including repeat units having conjugated diolefin (or diene) monomers, and further comprising at least one benzoxazine connected to one of the polymer chains via a spacer (or spacer group), wherein the spacer has a length ranging from 3 to 8 (preferably from 4 to 8 or from 4 to 7) atoms. Such a functionalized, preferably end-functionalized, elastomer has a reinforcing function in view of the benzoxazine molecule or ring structure coupled to the polymer chain, such as to an end of the polymer chain. Neighboring, or in other words, adjacent atoms along of the spacer are covalently bound to each other. Preferably, at least 20% of the repeat units are butadiene or isoprene units.

In one embodiment, the benzoxazine is connected to the spacer through its nitrogen atom (in particular, the nitrogen atom in a ring or ring structure of the benzoxazine).

In another embodiment, said repeat units further include residues of vinyl aromatic monomers (for instance styrene).

In another embodiment, the diene-based elastomer has or comprises the following structure:

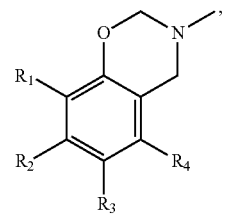

wherein $R_1$ is one of: a hydrogen atom, a hydrocarbon group, a cyclic hydrocarbon; $R_2$ is one of: a hydrogen atom, a hydrocarbon group, a cyclic hydrocarbon; $R_3$ is one of: a hydrogen atom, a hydrocarbon group, a cyclic hydrocarbon; and $R_4$ is a hydrogen atom, a hydrocarbon group, or a cyclic hydrocarbon, and wherein N is a nitrogen atom bonded to the polymer chain through the spacer. In general, the above mentioned hydrocarbon group and/or the cyclic hydrocarbon may comprise one or more hetero atoms, such as sulfur (S) atoms, nitrogen (N) atoms, silicon (Si) atoms, or oxygen (O) atoms.

In particular, such benzoxazine-functionalized elastomers can help to reinforce the rubber network in a rubber composition.

In another embodiment, at least one of $R_1$ and $R_3$ is a hydrogen atom. In particular, it is desirable that the ortho and/or the para positions (preferably both) carry only a hydrogen atom such that the benzoxazine can further react with other molecules or groups of the rubber matrix.

In another embodiment, said diene-based elastomer is chosen from polybutadiene rubber, polyisoprene rubber, isoprene-butadiene rubber, styrene-butadiene rubber (either solution polymerized or emulsion polymerized).

In another embodiment diene-based elastomer includes 1,3-butadiene monomer (e.g. in cis, trans or vinyl configuration), isoprene monomer and/or styrene monomer repeat units.

In still another embodiment, the benzoxazine (or benzoxazine group or ring structure, respectively) has or comprises one of the following (preferred) structures:

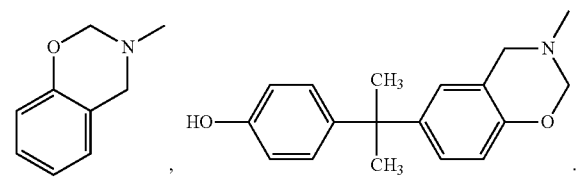 [SMILES: CN1COc2ccccc2C1 ; CN1COc2ccc(C(C)(C)c3ccc(O)cc3)cc2C1]

In still another embodiment, the benzoxazine-functionalized diene-based elastomer has or comprises the following structure:

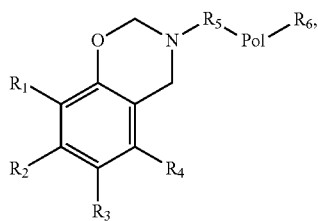

wherein $R_5$ is the spacer, Pol is the polymer chain, and $R_6$ is either a hydrogen atom or a functional group.

In a preferred embodiment the benzoxazine-functionalized diene-based elastomer has polymer chain of from 15 to 25,000 repeat units, and preferably of 25 to 25,000 repeat units, and/or has a weight average molecular weight (Mw) within a range of 1000 g/mol to 1,500,000, and preferably within a range of 1500 g/mol to 1,500,000 g/mol.

In another preferred embodiment, the benzoxazine-functionalized diene-based elastomer or the polymer chain has from 15 to 200 repeat units, preferably from 25 to 200 repeat units, and even more preferably from 40 to 200 repeat units); and/or has a weight average molecular weight (Mw) within a range of 1000 g/mol to 10,000 g/mol and preferably 1500 g/mol to 10,000 g/mol.

In yet another preferred embodiment, the benzoxazine-functionalized diene-based elastomer or the polymer chain has from 1000 to 25,000, and preferably from 1500 to 25,000 repeat units; and/or has a weight average molecular weight (Mw) within a range of 80,000 g/mol to 1,500,000 g/mol and preferably 85,000 g/mol to 1,400,000 g/mol).

In yet another embodiment, the end-functionalized diene-based elastomer has or comprises the following structure:

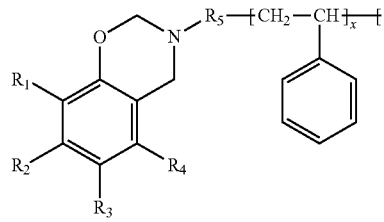

wherein $R_5$ is the spacer, and $R_6$ is one of a hydrogen atom and a functional group. Such a benzoxazine end-functionalized polymer, in particular a styrene butadiene rubber, is one of the most preferred embodiments. It can comprise different repeat units, or in other words monomer residues, including styrene (with a number x of styrene residues), 1,3-butadiene (with a number y of butadiene residues in cis and/or trans configuration), and/or with a number z of butadiene residues in vinyl configuration. It is for instance also possible that the polymer has only butadiene units (x=0). In general, one of the integers (and preferably at most two of the integers) x, y and z may be zero. The depicted order of repeat units does not limit the depicted polymer to the shown order. Rather the depicted units x, y, z may be in different orders along the polymer chain from that explicitly shown. For instance, the styrene repeat units, cis-1,4-butadiene repeat units, trans-1,4-butadiene repeat units, and vinyl 1,2-butadiene repeat units can distributed in a random order, an essentially random order, or in a tapered order. The polymer chain length defined by the sum of the integers x, y, and z can vary over a wide range. Preferably, the sum of x+y+z is within a range of 15 to 25000 repeat units.

In yet another embodiment, $R_6$ is selected from silane groups, siloxane groups, amine groups, and silicon tetrachloride groups ($—SiCl_3$).

In still another embodiment, the majority of (covalent) bonds along the spacer are single bonds. Preferably, at least the three bonds closest to the nitrogen atom are single bonds. Preferably, double bonds are avoided at these positions to avoid formation of energetically favorable ring structures upon attack of formaldehyde. Preferably all of the bonds along the spacer are single bonds.

In still another embodiment, the spacer ($R_5$) comprises along its length one of an ethylene, a propylene, a butylene, a pentylene, and a hexylene group, with or without one or more hetero atoms.

In still another embodiment, the spacer ($R_5$) comprises a silyl group.

In yet another embodiment, the spacer ($R_5$) comprises a silyl group and the polymer chain is (directly) coupled via an oxygen atom to the silyl group.

In still another embodiment the spacer ($R_5$) is directly bonded to one of the repeat units, such as to one of the conjugated diolefins or diolefin monomers.

In still another embodiment, the spacer (such as $R_5$) has the following structure:

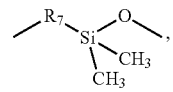

wherein $R_7$ is one of an ethylene, a propylene, a butylene, a pentylene, and a hexylene group, with or without one or more hetero atoms ($R_7$ being coupled to the benzoxazine), and wherein O is an oxygen atom bonded to the polymer chain.

In still another embodiment, the spacer ($R_5$) is or comprises an alkylene group, with our without hetero atoms.

In still another embodiment, the conjugated diolefin monomer contains from 4 to 8 carbon atoms.

In still another embodiment, the conjugated diolefin monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

In still another embodiment, a plurality of benzoxazines are covalently bonded to the polymer chains along the backbone of said polymer chains.

In still another embodiment, the elastomer is void of benzoxazines along the backbone of said polymer chains.

In a second aspect of the invention, the invention is directed to a rubber composition, preferably for a tire or tire component, the rubber composition comprising 30 phr to 200 phr of a filler, 10 phr to 100 phr of a benzoxazine-functionalized (diene-based) elastomer as described in the first aspect and optionally according to one of its embodiments above.

In one embodiment of the invention, the rubber composition further comprises at least 0.5 phr of a sulfur donor, and/or at least 0.5 phr of a sulfur vulcanization accelerator. The term sulfur donor shall include herein also sulfur as such. In other words, such a rubber composition is a sulfur-vulcanizable rubber composition.

The rubber composition may also comprise 5 phr to 60 phr of a resin, such as a traction resin.

In an embodiment, the rubber composition may include at least one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two or at least two additional diene-based rubbers. For example, a combination of two or more rubbers is preferred, such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene-butadiene rubber (ESBR) might be used having a bound styrene content of 20 percent to 28 percent or, for some applications, an ESBR having a medium to relatively high bound styrene content, namely, a bound styrene content of 30 percent to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 percent to 50 percent. In one aspect, the ESBR may also contain acrylonitrile to form a terpolymer rubber, as ESBAR, in amounts, for example, of 2 weight percent to 30 weight percent bound acrylonitrile in the terpolymer. Emulsion polymerization prepared styrene/butadiene/acrylonitrile copolymer rubbers containing 2 weight percent to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 percent to 50 percent, preferably 9 percent to 36, percent, and most preferably 26 percent to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

In one embodiment of this invention the benzoxazine-functionalized diene-based elastomer is comprised of polymer chains which include repeat units which include conjugated diolefin monomers and benzoxazine rings which are connected to the polymer chain via a spacer, wherein the spacer has a length ranging from 3 to 8 carbon atoms. Some representative examples of spacers include ethylene groups, propylene groups, butylene groups, pentylene groups, and hexylene groups. In another embodiment of this invention the spacer can include a heteroatom. The conjugated diolefin monomer typically contains from 4 to 8 carbon atoms and is frequently selected from one or more monomers which are selected from 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. The polymer chains can also optionally include one or more vinyl aromatic monomers, such as styrene, p-methyl styrene, α-methyl styrene, and vinylnaphthalene. In one specific embodiment of this invention a plurality of benzoxazine rings are attached as pendent groups to the polymer chains along the backbones of said polymer chains. In still another embodiment of this invention the benzoxazine-functionalized diene-based elastomer is void of benzoxazine rings which are situated at the chain ends of the polymer chains.

A glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg can be suitably determined as a midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 to 5 phr, of one or more additional diene-based rubbers, such as SBR, SSBR, ESBR, PBD/BR, NR and/or synthetic polyisoprene. In another example, the composition may include less than 5 phr, preferably less than 3, phr of an additional diene-based rubber or be also essentially free of such an additional diene-based rubber. The terms "compound" and "composition" and "formulation" may be used herein interchangeably, unless indicated otherwise.

In another embodiment, the rubber composition includes from 1 phr to 80 phr, or from 5 phr to 80 phr, of a resin, preferably having a glass transition temperature Tg greater than 20° C. A Tg for resins can be suitably determined as a peak midpoint by a differential scanning calorimeter (DSC) at a temperature rate of increase of 10° C. per minute, according to ASTM D6604 or equivalent. Preferably, the resin has a softening point above 70° C. as determined by ASTM E28 which might sometimes be referred to as a ring and ball softening point. In one embodiment, the rubber composition includes from 10 phr to 60 phr or from 20 phr to 60 phr or from 30 phr to 60 phr of resin.

In another embodiment, the resin is selected from the group consisting of coumarone-indene resin, petroleum hydrocarbon resin, terpene polymers/resins, styrene/alphamethylstyrene resins, terpene phenol resin, rosin derived resins and copolymers and/or mixtures thereof.

A coumarone-indene resin preferably contains coumarone and indene as monomer components making up the resin skeleton (main chain). Monomer ingredients other than coumarone and indene which may be incorporated into the skeleton are, for example, methyl coumarone, styrene, α-methylstyrene, methylindene, vinyltoluene, dicyclopentadiene, cyclopentadiene, and diolefins such as isoprene and piperlyene. Coumarone-indene resins have preferably melting points ranging from 10° C. to 160° C. (as measured by the ball-and-ring method). Even more preferably, the melting point ranges from 30° C. to 100° C.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins. Petroleum resins are typically available with softening points ranging from 10° C. to 120° C. Preferably, the softening point ranges from 30° C. to 100° C.

Terpene resins are preferably comprised of polymers of at least one of limonene, alpha pinene, beta pinene and delta-3-carene. Such resins are available with melting points ranging from 10° C. to 135° C.

Terpene-phenol resins may be derived by copolymerization of phenolic monomers with terpenes such as limonenes, pinenes and delta-3-carene.

Representative for resins derived from rosins and derivatives thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

A styrene/α-methylstyrene resin is considered herein to be a (preferably relatively short chain) copolymer of styrene and α-methylstyrene with a styrene/α-methylstyrene molar ratio in a range of about 0.05 to about 1.50. In one aspect, such a resin can be suitably prepared, for example, by cationic copolymerization of styrene and α-methylstyrene in a hydrocarbon solvent. Thus, the contemplated styrene/α-methylstyrene resin can be characterized, for example, by its chemical structure, namely, its styrene and alphamethylstyrene contents and by its glass transition temperature, molecular weight and molecular weight distribution.

In one embodiment, said resin may be partially or fully hydrogenated.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include up to 70 phr of processing oil, preferably between 5 phr and 25 phr. In another scenario less than 10 phr oil, or even less than 5 phr of procession oil can be utilized.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area can be suitably determined according to ASTM D6556 or equivalent and is described in the Journal of the American Chemical Society, Volume 60, Page 304 (1930). The conventional silica may also be characterized by having a dibutylphthalate (DBP) absorption value in a range of 100 cm$^3$/100 g to 400 cm$^3$/100 g, alternatively 150 cm$^3$/100 g to 300 cm$^3$/100 g which can be suitably determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance between 5 phr and 120 phr, preferably in a range of between 20 phr and 70 phr or 80 phr to 120 phr. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

In still another embodiment, the rubber composition may comprise pre-silanized and precipitated silica which may for instance have a CTAB adsorption surface area of between 130 m$^2$/g and 210 m$^2$/g, optionally between 130 m$^2$/g and 150 m$^2$/g and/or between 190 m$^2$/g and 210 m$^2$/g, or even between 195 m$^2$/g and 205 m$^2$/g. The CTAB (cetyl trimethyl ammonium bromide) method for determination of the silica surface area (ASTM D6845) is known to the person skilled in the art.

In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731, the teachings of which are incorporated herein for the purpose of describing pre-hydrophobated precipitated silica and techniques for making such pre-hydrophobated precipitated silica.

In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane.

The mercaptosilane with its thiol (—SH) groups may improve compatibility with the rubber material or rubber matrix and/or support the curing process.

The amount mercapto groups on the surface of the silica may be in the range of between 0.1 and 1 weight percent, alternatively 0.4 to 1 weight percent or 0.4 to 0.6 weight percent.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas include Agilon® 400, Agilon® 454 and Agilon® 458 from PPG Industries.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 cm$^3$/100 g to 150 cm$^3$/100 g. Iodine absorption values can be suitably determined according to ASTM D1510 or equivalent. Commonly employed carbon blacks can be used as a conventional filler such as in an amount ranging from 10 phr to 150 phr. In another embodiment, from 20 phr to 80 phr of carbon black may be used.

In another embodiment, other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757, 6,133,364, 6,372,857, 5,395,891, or 6,127,488, and a plasticized starch composite filler including but not limited to that disclosed in U.S. Pat. No. 5,672,639. Such other fillers may be used in an amount ranging from 1 to 30 phr.

In one embodiment, the rubber composition may contain sulfur containing organosilicon compounds or silanes. Examples of suitable sulfur containing organosilicon compounds are of the formula:

$$Z\text{-Alk-}S_n\text{-Alk-}Z \qquad \text{I}$$

in which Z is selected from the group consisting of

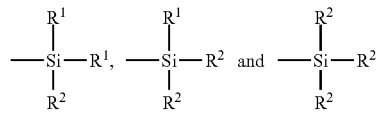

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

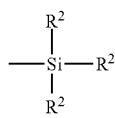

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. The teachings of United States Patent Application Publication No. 2003/0130535 are incorporated herein by reference for the purpose of disclosing sulfur containing organosilicon compounds which are suitable for use in the practice of this invention. In one embodiment, the sulfur containing organo silicon compound is Si-363 from Degussa. The amount of the sulfur containing organosilicon compound in a rubber composition may vary depending on the level of other additives that are used. Generally speaking, the amount of the compound may typically range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifier resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be carried out over a period which is within the range of 1 to 20 minutes.

In another aspect, the present invention is directed to an article of manufacture comprising such a rubber composition.

In one embodiment, the article of manufacture is one of a tire, a power transmission belt, a hose, a track, an air sleeve, and a conveyor belt.

In an embodiment, the rubber composition may be incorporated in a variety of rubber components of a tire (or in other words tire components). For example, the rubber component may be a tread (including tread cap and tread base), sidewall, apex, chafer, sidewall insert, wirecoat or innerliner. A tire may for example be a pneumatic tire or nonpneumatic tire, a race tire, a passenger tire, an aircraft tire, an agricultural tire, an earthmover tire, an off-the-road (OTR) tire, a truck tire, or a motorcycle tire. The tire may also be a radial or bias tire.

Vulcanization of a pneumatic tire or rubber composition in accordance with an embodiment of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In still another aspect, the invention is directed to a method of manufacturing a benzoxazine-functionalized elastomer (for instance as described above), the method comprising the following steps:
  providing an amine-functionalized (such as a primary amine end-functionalized), optionally diene-based, elastomer comprising at least one polymer chain, an amine group, and a spacer connecting the amine group with the polymer chain;
  reacting said functionalized elastomer with a phenol, in particular in the presence of an aldehyde derivative to obtain the benzoxazine-functionalized elastomer.

In one embodiment, said spacer (or spacer group) has a length of 3 to 8 atoms. In other words, the spacer has from 2 to 7 covalent bonds along the spacer or spacer group, respectively between the atoms of the spacer or spacer group along the spacer or spacer group.

In another embodiment, said amine-functionalized diene-based elastomer has the following structure:

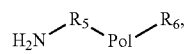

wherein $R_5$ is the spacer, Pol is the polymer chain, and $R_6$ is one of a hydrogen atom and a functional group.

In one embodiment, the polymer chain comprises one or more monomer units selected from the group of vinyl aromatic monomers, such as styrene and conjugated diolefin monomers, for example 1,3-butadiene, and/or isoprene. Preferably, at least 50 weight percent of the repeat units in the polymer with be derived from a conjugated diolefin monomer.

In another embodiment, said amine-functionalized elastomer has or comprises the following structure:

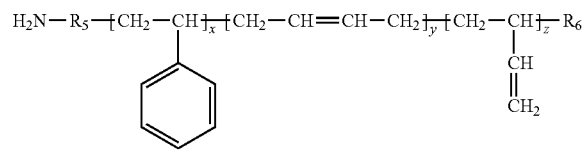

wherein $R_5$ is the spacer, and $R_6$ is one of a hydrogen atom and a functional group, e.g. as listed already herein above. It can comprise different repeat units, or in other words monomer residues, including styrene, e.g. with a number of x styrene monomer residues, butadiene, e.g. with a number of y butadiene monomer residues in cis and/or trans configuration, and/or with a number z of butadiene monomer residues in vinyl configuration. It is for instance also possible that the polymer has only butadiene monomer residues (x=0). In general, one of the integers (and preferably at most two of the integers) x, y and z may be zero. The depicted order of repeat units does not limit the depicted molecule to the explicitly shown order. Rather the depicted monomers x, y, z may have different order along the polymer chain (i.e. between $R_5$ and $R_6$). The polymer chain length defined by the numbers x, y, z of repeat units can vary. Preferably, the sum of x+y+z is within a range of 15 to 25000 repeat units, or in other words, monomer residues.

In still another embodiment, the aldehyde derivative is selected from the group of formaldehyde, paraformaldehyde, polyoxymethylene, and aldehydes having the formula RCHO, wherein R is a substituted or unsubstituted aliphatic $C_1$-$C_{20}$ alkyl group, with or without heteroatoms. Formaldehyde would typically be preferred.

In still another embodiment, polymer chain is further comprised of repeat units which are derived from a vinyl aromatic monomer.

In yet another embodiment, the vinyl aromatic monomer is selected from the group consisting of styrene, p-methyl styrene, α-methyl styrene, and vinylnaphthalene.

In still another embodiment, the phenol is a diphenol or a derivative thereof. However, the phenol can also be a monophenol.

In still another embodiment, the step of reacting said functionalized elastomer with a phenol is carried out at a temperature of between 50° C. and 200° C., preferably between 60° C. and 180° C.

In yet another embodiment, the step of reacting said functionalized elastomer with a phenol is carried out in an inert organic solvent. Some representative examples of inert organic solvents that can be used include chloroform, 1,4-dioxane, n-heptane, mixed heptanes, tetrahydrofuran, and toluene. Some other solvents may be less preferable due to their relatively low boiling points. Such solvents having lower boiling points can optionally be used, but normally required the reaction to be conducted in a pressurized reaction vessel. Examples of less favorable lower boiling solvents include methylene chloride, diethyl ether, and lower molecular weight alkanes.

In yet another embodiment, the functionalized elastomer is reacted with said phenol and a formaldehyde derivative for at least 8 hours, preferably at least 24 hours.

The features of the above aspects and/or embodiments may be combined with one another other.

BRIEF DESCRIPTION OF THE DRAWINGS

The invention will be described by way of example and with reference to the accompanying drawings in which:

FIG. 1 is a schematic cross section of a tire which comprises a benzoxazine-functionalized elastomer according to an embodiment of the present invention.

DETAILED DESCRIPTION OF THE EMBODIMENTS

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds.

While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

In the embodiment of FIG. 1, one or more rubber components, in particular, the tread 10 comprise a benzoxazine-functionalized elastomer. In principle, also other rubber components, such as a coating compound of the carcass ply 9, a coating compound of the overlay ply 12, the apexes 5 or other rubber components of the tire 1 can comprise such an elastomer. The elastomer may be blended with other elastomers, for instance with one or more solution polymerized styrene-butadiene rubbers, polybutadiene or polyisoprene rubber.

In a non-limiting embodiment, a benzoxazine-functionalized elastomer is manufactured as shown herein below:

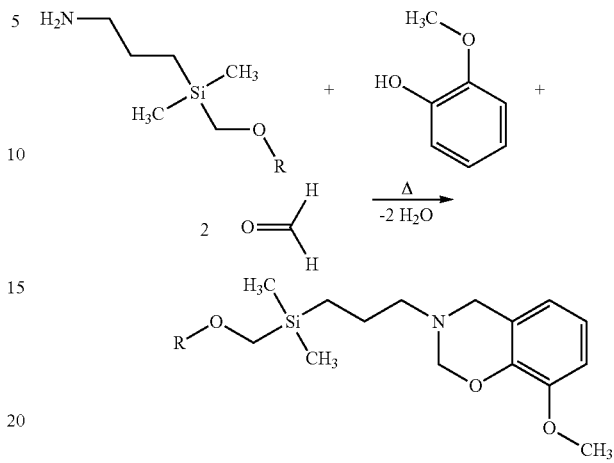

Thus, the elastomer having a polymer chain R (such as a polybutadiene or a styrene-butadiene) is end-functionalized with an amine group $NH_2$ which is bound to the elastomer R via the depicted spacer. This elastomer is reacted in the present example with guaiacol (a monophenol) and formaldehyde. At elevated temperatures, it reacts to a benzoxazine end-functionalized elastomer. Such a benzoxazine structure can further react as reinforcing agent in a rubber network. In particular, it can further react with other benzoxazines to form a reinforcing benzoxazine network.

In a further non-limiting embodiment, another benzoxazine-functionalized elastomer is manufactured as shown below:

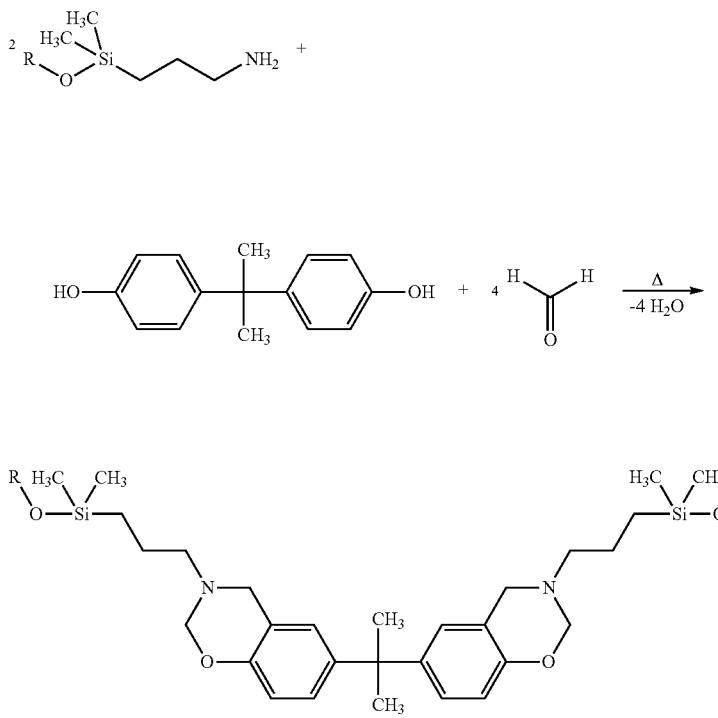

Thus, an elastomer having a polymer chain R (such as polybutadiene or a solution polymerized styrene-butadiene rubber) is again end-functionalized with an amine group (NH$_2$) which is bound to the elastomer R via the depicted spacer (a propylene spacer in the reaction depicted above). This elastomer is reacted in the present example with bisphenol A and formaldehyde. After being heated to an elevated temperature, it reacts to a benzoxazine (end-) functionalized elastomer. In the present specific example, two polymer chains have been connected at their ends to a respective phenyl group of bisphenol A based benzoxazine. Such a benzoxazine structure can also react as reinforcing agent in a rubber network. In particular, it can further react with other benzoxazines to form a reinforcing benzoxazine network.

The above reaction is carried out in an inert organic solvent, such as a halogenated organic solvent (for example chloroform). However, as explained herein other inert solvents can also be utilized.

In the present example, the reaction was conducted at a temperature of 70° C. and the reaction was carried out for a period of about 48 hours.

In a preferred embodiment of this invention, the spacer starts with an atom directly bonded to the nitrogen atom of the benzoxazine ring (or ring structure) and ends with an atom directly bonded to a repeat unit of the polymer.

While the present embodiments suggest a specific spacer in combination with styrene butadiene rubber and polybutadiene, other spacers and polymers are possible within the scope of the present invention. Formaldehyde is a preferred but non-limiting example of an aldehyde derivative for a benzoxazine reaction in accordance with the present invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A benzoxazine-functionalized diene-based elastomer comprising:
    polymer chains having repeat units which include conjugated diolefin monomers, and
    at least one benzoxazine connected to the polymer chains via a spacer, wherein the spacer has the following structure:

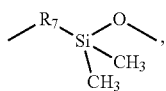

wherein R$_7$ represents an ethylene group, a propylene group, a butylene group, a pentylene group, or a hexylene group; and wherein O is an oxygen atom covalently bound to the polymer chain, or wherein the spacer is an alkylene group having a length in a range of from 3 to 8 atoms, and wherein the benzoxazine comprises one of the following structures:

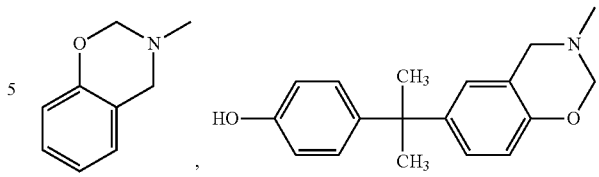

2. The benzoxazine-functionalized diene-based elastomer of claim 1 wherein said repeat units further include residues of vinyl aromatic monomers.

3. The benzoxazine-functionalized diene-based elastomer of claim 1 wherein the benzoxazine has the following structure:

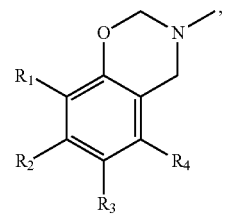

wherein:
    N is a nitrogen atom covalently bound to the polymer chain through the spacer.

4. The benzoxazine-functionalized diene-based elastomer of claim 3 wherein the benzoxazine-functionalized diene-based elastomer comprises the following structure:

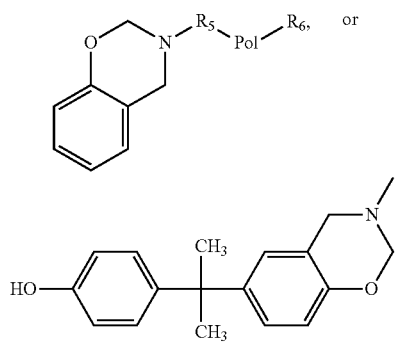

wherein:
    R$_5$ is the spacer;
    Pol is the polymer chain; and
    R$_6$ is one of a hydrogen atom and a functional group.

5. The benzoxazine-functionalized diene-based elastomer of claim 1 wherein the polymer chain has one or more of:
    i) between 15 and 25,000 repeat units; or
    ii) a weight average molecular weight which is within a range of 1000 g/mol to 1,500,000 g/mol.

6. The benzoxazine-functionalized diene-based elastomer of claim 3 wherein the benzoxazine-functionalized diene-based elastomer comprises the following structure:

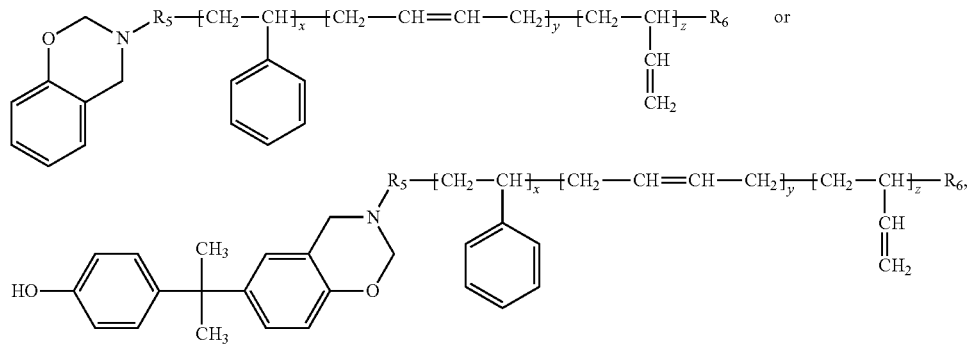

wherein:

$R_5$ is the spacer;

X, y, and z are integers or zero, and wherein at most two of x, y, and z may be zero; and $R_6$ is a hydrogen atom or a functional group.

7. The benzoxazine-functionalized diene-based elastomer of claim 4 wherein $R_6$ is a functional group selected from the group consisting of: silane containing groups, siloxane containing groups, secondary amine groups, and silicon tetrachloride derivatives.

8. The benzoxazine-functionalized diene-based elastomer of claim 1 wherein the majority of bonds along the spacer are single bonds.

9. The benzoxazine-functionalized diene-based elastomer of claim 1 wherein the conjugated diolefin monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

10. A rubber composition comprising:
30 to 200 phr of a filler; and
10 to 100 phr of the benzoxazine-functionalized diene-based elastomer according to claim 1.

11. An article of manufacture selected from a tire, a power transmission belt, a hose, a track, an air sleeve, and a conveyor belt, comprising the rubber composition according to claim 10.

* * * * *